Figures 1, 2:
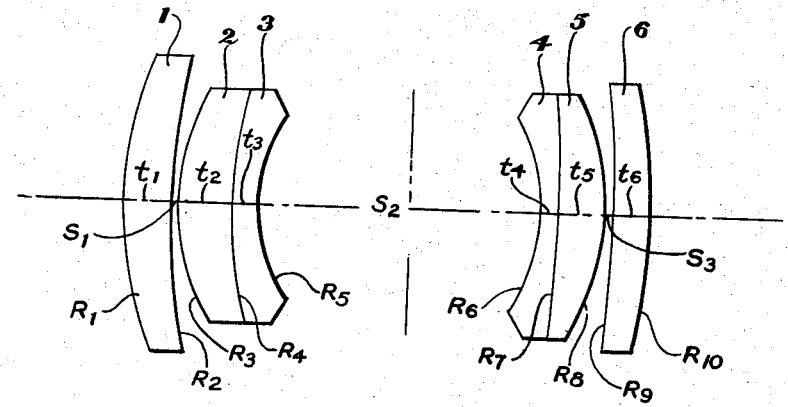

May 9, 1961  W. SCHADE  2,983,193
HIGH RESOLUTION PHOTOGRAPHIC OBJECTIVES
Filed Nov. 28, 1958

| $f = 100$ mm. | | | | $f/3.5$ |
|---|---|---|---|---|
| LENS | N | V | RADII | THICKNESSES |
| 1 | 1.740 | 45.8 | $R_1=+47.74$ mm. | $t_1 = 6.3$ mm. |
|   |       |      | $R_2=+88.67$ | $S_1 = 0.4$ |
| 2 | 1.693 | 56.2 | $R_3=+28.61$ | $t_2 = 6.9$ |
| 3 | 1.683 | 30.9 | $R_4=+54.46$ | $t_3 = 3.5$ |
|   |       |      | $R_5=+20.42$ | $S_2 = 36.0 = S_c$ |
| 4 | 1.667 | 32.2 | $R_6=-23.85$ | $t_4 = 2.0$ |
| 5 | 1.740 | 43.9 | $R_7=-1432.$ | $t_5 = 6.2$ |
|   |       |      | $R_8=-30.05$ | $S_3 = 0.1$ |
| 6 | 1.740 | 46.4 | $R_9=-1012.$ | $t_6 = 4.9$ |
|   |       |      | $R_{10}=-75.03$ | |

Willy Schade
INVENTOR.
BY R. Frank Smith
Harold F. Bennett
ATTORNEY & AGENT

United States Patent Office 2,983,193
Patented May 9, 1961

2,983,193
HIGH RESOLUTION PHOTOGRAPHIC OBJECTIVES
Willy Schade, Rochester, N.Y., assignor to Eastman Kodak Company, Rochester, N.Y., a corporation of New Jersey
Filed Nov. 28, 1958, Ser. No. 776,901
1 Claim. (Cl. 88—57)

This invention relates to photographic objectives of the type known traditionally as the Gauss type and designated as an M-type objective in a systematic classification of photographic lenses published in the J.O.S.A. of May 1946. In this specification and the appended claim, the designation "M-type" will be used.

The object of the present invention is to provide an M-type photographic objective highly corrected for the ordinary aberrations and oblique spherical aberrations and higher orders of coma when made up in apertures of about $f/5$ to about $f/3.5$ and when used to cover a field of about 15° from the axis and to produce pictures of medium-to-low-contrast object fields with a high degree of recognizable detail or "acutance."

The M-type photographic objective is defined as an objective comprising four axially aligned and air-spaced components of which the outer two are positive and the inner two are meniscus-shaped negative components arranged with concave surfaces facing one another. These components may be mounted in a standard type lens barrel and usually a diaphragm is mounted in the central space between the two negative components.

The present invention relates preferably to M-type objectives in which the positive components are single positive elements and are shaped with their more strongly curved surfaces turned to the outside, in which each negative component is made up of a positive element and a negative element, arranged with a small air space within the component in a manner known in the prior art or preferably cemented together, in which the radii of curvature of the outer convex surfaces of the negative components are shorter than the respective radii of curvature of the outer surfaces of the adjacent positive components and in which the radii of curvature of the two surfaces bounding the central air space are each greater than $0.1\,f$ where $f$ is the focal length of the objective.

The name "optical image evalution" denotes the part of the field of optics relating generally to a study of picture quality and its relation to the aberration residuals of the lens and other factors such as film graininess. See for example National Bureau of Standards Circular 526 (1954) and the papers published in the J.O.S.A. of September 1956. While the last word has not been written on this subject, it is generally agreed that picture quality and recognition of detail are not synonymous with the classical concept of resolution or resolving power. In fact, lens and film combinations have been demonstrated which give very high resolution when photographing stars in a dark sky but which give very inferior-looking pictures when photographing a medium or low-contrast object field. See Higgins & Perrin, in Photographic Science and Engineering, vol. 2, p. 75, August 1958. Furthermore, the classical concept of the Seidel aberrations has been found to be inadequate to determine the quality of a photographic lens. Modern design methods involve computing focal plots of several hundred points (either by computing one ray separately for each point or pair of points plotted or by interpolation of some of the points) to determine the distribution of energy when a point object is imaged on a selected focal plane. One practical criterion which has been suggested is to determine the smallest circle containing 30% of the energy in this focal plane and to consider the diameter of this circle as representing the size of detail which the lens will render recognizably. Under certain conditions of high or low contrast, a percentage other than 30% may be found to agree better with the results of experimental observation, but 30% is a good figure for ordinary conditions.

The object of the present invention, accordingly, is more specifically to provide a photographic objective of the M-type in which the several aberrations are highly corrected and the residuals thereof, although very small, are balanced against each other so as to give a high degree of rendering of recognizable detail in all parts of the selected angular field of view.

According to the invention, an M-type objective of the kind defined above is made up embodying one or more of several features which I have found to contribute to the high degree of correction and resolution of detail which has been attained.

According to one feature of the invention, the central space is made longer than is generally done in the prior art. This feature is applied to a moderate degree by making the central space longer than $.25\,f$, and when applied to this degree in combination with one or more of the other features of the invention, the objects of the invention are attained to a satisfactory degree. When this feature is applied to a high degree by making the central space longer than $.32\,f$, the objects of the invention are attained by this feature alone. I have not determined exactly how long the central space can be made and still give the superior results of the invention, but up to about $.42\,f$ definitely does give the novel effect to a useful degree. Beyond this, the results are less superior.

According to a second feature of the invention, the front component, that is, the component facing the longer conjugate, is made in meniscus form with the rear surface concave and having a radius of curvature between $.5\,f$ and $1.25\,f$.

According to a third feature of the invention, the two negative components are made up as cemented doublets and the front surface of the rear positive component is concave and has a radius of curvature between $2\,f$ and $20\,f$.

According to a fourth feature of the invention, the radii of curvature designated as $R_5$ and $R_8$ of the concave surfaces which bound the central air space $S_c$ on the front and on the rear respectively are made shorter than $0.7S_c$ and shorter than $0.85S_c$ respectively. This feature, in combination with the unusually longer central air space as above defined, is very beneficial in correcting the oblique spherical aberrations.

A fifth feature of the invention is related to the color correction and may be conveniently defined in either of two ways; according to one definition the sum of the dispersive indices of the four positive elements is between 2.5 and 3.8 times the sum of the dispersive indices of the two negative elements of the objective, and according to the other way of defining this feature the two meniscus negative components are made up as cemented doublets and the radius of curvature of each cemented surface is numerically greater than $0.4\,f$, the dispersive indices being selected to give axial and lateral color correction.

A sixth feature of the invention pertains to the shapes of the meniscus negative components and it likewise may be conveniently defined in either of two ways. According to one way of defining this feature $R_5$ is between $.20\,f$ and $.216\,f$ and $R_6$ is between $.23\,f$ and $.27\,f$ and according to the other way of defining this feature, $R_3$ is between $.285\,f$ and $.32\,f$ and $R_8$ is between $.29\,f$ and $.33\,f$ where $R_3$ and $R_8$ are the radii of curvature of the outer convex surfaces of the front and rear negative components respectively. The best objectives which I have designed according to the invention have negative components which are within these defined shapes and this feature is believed to contribute materially to the high degree of resolution obtained.

Preferably, the refractive index of each positive element is between 1.63 and 1.85 and that of each negative element between 1.62 and 1.80.

A preferred embodiment of the invention will be described with reference to the accompanying sheet of drawings in which:

Fig. 1 is a diagrammatic axial section of an objective according to the invention, and Fig. 2 is a table of constructional data of a specific embodiment of the invention according to Fig. 1.

In Fig. 1 the objective shown is made up of four components of which the outer two 1, 6 are simple positive elements and the inner two are doublets made up of elements 2 and 3 and of elements 4 and 5 respectively. These are shown as cemented doublets but in some forms of the invention they may be made up with a small air space in one or both of them in a manner well known in the prior art.

Fig. 2 is a table giving constructional data for one specific embodiment of the invention according to Fig. 1. This table is repeated below.

[$f$=100 mm.    $f/3.5$]

| Lens | N | V | Radii, mm. | Thicknesses, mm. |
|---|---|---|---|---|
| 1 | 1.740 | 45.8 | $R_1=+47.74$ | $t_1= 6.3$ |
|   |       |      | $R_2=+88.67$ | $S_1= 0.4$ |
|   |       |      | $R_3=+28.61$ |            |
| 2 | 1.693 | 56.2 |              | $t_2= 6.9$ |
|   |       |      | $R_4=+54.46$ |            |
| 3 | 1.683 | 30.9 |              | $t_3= 3.5$ |
|   |       |      | $R_5=+20.42$ |            |
|   |       |      |              | $S_2=36.0=S_c$ |
|   |       |      | $R_6=-23.85$ |            |
| 4 | 1.667 | 32.2 |              | $t_4= 2.0$ |
|   |       |      | $R_7=-1,432$ |            |
| 5 | 1.740 | 43.9 |              | $t_5= 6.2$ |
|   |       |      | $R_8=-30.05$ |            |
|   |       |      |              | $S_3= 0.1$ |
|   |       |      | $R_9=-1,012$ |            |
| 6 | 1.740 | 46.4 |              | $t_6= 4.9$ |
|   |       |      | $R_{10}=-75.03$ |         |

In this table as in the drawings, the lens elements are numbered from front to rear in the first column, the refractive index N for the D line of the spectrum and the conventional dispersive index V for each lens element are given in the second and third columns, the radii of curvature R of the optical surfaces, the thicknesses $t$ of the lens elements and the air spaces S between elements, each numbered by subscript from front to rear, are given in the last two columns of the table. The dimensions are given for a focal length F equal to 100 mm. in the customary way, and the lens was originally designed to be made up in a focal length of about 10 or 12 inches. The second air space $S_2$ is in this case the central air space designated as $S_c$ in the claim and elsewhere in the specification. It will be noted that in the form of the invention in which a small air space is included in the second component, the central air space is the third air space of the system, and the designation $S_c$ is used to avoid ambiguity.

It will be noted that the example shown in Figs. 1 and 2 embodies all the features of the invention. The central space $S_c$ is between 32 and 42 mm., the radius of curvature of the rear surface of the front component $R_2$ is between .5 $f$ and 1.25 $f$, $R_5$ and $R_6$ are greater than 0.1 the focal length as is characteristic of this type of lens and are 57% and 66½% respectively of the length of the central air space in accordance with this feature of the invention. The sum of the dispersive indices of the four positive lens elements 1, 2, 5 and 6, is 192.3, and the sum of the dispersive indices of the negative elements 3 and 4 is 63.1. Clearly the former is betwen 2.5 and 3.8 times the latter, and the radii of curvature of the two cemented surfaces $R_4$ and $R_7$ are each numerically greater than 0.4 $f$ in accordance with the two ways of describing this feature of the invention. An infinite radius for either cemented surface represents a plane surface and is considered within the scope of the invention. It is directly evident from the table that this example also embodies all the other features of the invention hereinbefore set forth.

An objective according to the example was made up and subjected to extensive tests both in the laboratory and under normal conditions of use and was found to give very superior results. However, experimentation still continued, particularly with respect to varying the air spaces, as these can be varied without regrinding and polishing any lens element. It required extensive testing to determine what constituted an average improvement in the image, and the conclusion was that a slight lengthening of the central air space produces a slightly flatter field and slightly better resolution of low-contrast objects throughout the selected field of view. It was decided that a central air space of 36.7 mm. produces the best average results and it was found that this adjustment changes the focal length to 100.34 mm. It is not believed necessary to show a complete separate table of data in this specification, to show this slight change.

Having described my invention and a preferred embodiment thereof, it is pointed out that the invention is not restricted to the examples shown but is of the scope defined by the appended claim.

I claim:

A six-element M-type photographic objective made substantially according to the specifications set forth in the following table:

| Lens | N | V | Radii | Thicknesses |
|---|---|---|---|---|
| 1 | 1.74 | 46 | $R_1=+0.48f$ | $t_1= .06f$ |
|   |      |    | $R_2=+0.89f$ | $S_1=.004f$ |
|   |      |    | $R_3=+0.29f$ |             |
| 2 | 1.69 | 56 |              | $t_2= .07f$ |
|   |      |    | $R_4=+0.54f$ |             |
| 3 | 1.68 | 31 |              | $t_3= .04f$ |
|   |      |    | $R_5=+0.20f$ |             |
|   |      |    |              | $S_2= .36f$ |
|   |      |    | $R_6=-0.24f$ |             |
| 4 | 1.67 | 32 |              | $t_4= .02f$ |
|   |      |    | $R_7= -14f$  |             |
| 5 | 1.74 | 44 |              | $t_5= .06f$ |
|   |      |    | $R_8= -.30f$ |             |
|   |      |    |              | $S_3=.001f$ |
|   |      |    | $R_9= -10f$  |             |
| 6 | 1.74 | 46 |              | $t_6= .05f$ |
|   |      |    | $R_{10}=-0.75f$ |          | where the lens elements are numbered from front to rear in the first column, the corresponding refractive indices N for the D wavelength and the conventional dispersive index V are given in the second and third columns, and the radii of curvature R of the lens surfaces, the axial thicknesses $t$ of the lens elements, and the spaces S between the components, each numbered by subscript from front to rear, are given in the last two columns, and where $f$ is the equivalent focal length of the objective, and the + and − values of radii indicate surfaces respectively convex and concave to the front.

References Cited in the file of this patent

UNITED STATES PATENTS

| 2,389,016 | Wynne | Nov. 13, 1945 |
| 2,401,324 | Altman | June 4, 1946 |
| 2,416,032 | Warmisham et al. | Feb. 18, 1947 |
| 2,475,938 | Altman | July 12, 1949 |
| 2,532,751 | Baker | Dec. 5, 1950 |
| 2,682,198 | Aklin | June 29, 1954 |
| 2,799,207 | Lange | July 16, 1957 |
| 2,831,397 | Berger et al. | Apr. 22, 1958 |

FOREIGN PATENTS

| 746,201 | Great Britain | Mar. 14, 1956 |
| 760,613 | Great Britain | Nov. 7, 1956 |